(12) United States Patent
Li et al.

(10) Patent No.: US 7,953,181 B2
(45) Date of Patent: May 31, 2011

(54) MIMO TRANSMITTING APPARATUS AND MIMO TRANSMITTING METHOD

(75) Inventors: Haitao Li, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 761 days.

(21) Appl. No.: 11/908,881

(22) PCT Filed: Mar. 24, 2006

(86) PCT No.: PCT/JP2006/306020
§ 371 (c)(1),
(2), (4) Date: Dec. 10, 2007

(87) PCT Pub. No.: WO2006/101209
PCT Pub. Date: Sep. 28, 2006

(65) Prior Publication Data
US 2009/0003485 A1    Jan. 1, 2009

(30) Foreign Application Priority Data
Mar. 24, 2005    (CN) .......................... 2005 1 0055979

(51) Int. Cl.
*H04L 27/00* (2006.01)
(52) U.S. Cl. ......................................................... 375/299
(58) Field of Classification Search .................... 375/299
See application file for complete search history.

(56) References Cited

U.S. PATENT DOCUMENTS

| | | | |
|---|---|---|---|
| 6,891,898 B2 | 5/2005 | Peyla et al. | |
| 2003/0050032 A1 | 3/2003 | Masaki | |
| 2003/0185310 A1* | 10/2003 | Ketchum et al. ............... | 375/259 |
| 2005/0041751 A1 | 2/2005 | Nir et al. | |
| 2006/0014545 A1* | 1/2006 | Mo et al. ..................... | 455/456.1 |
| 2006/0126752 A1* | 6/2006 | Hansen et al. ................ | 375/267 |
| 2006/0148429 A1* | 7/2006 | Inogai et al. ............... | 455/115.1 |
| 2007/0280370 A1* | 12/2007 | Liu ................ | 375/267 |

FOREIGN PATENT DOCUMENTS

| | | |
|---|---|---|
| CN | 1351787 | 5/2002 |
| CN | 1404291 | 3/2003 |
| CN | 1504024 | 6/2004 |
| WO | 03084092 | 10/2003 |
| WO | 2004064311 | 7/2004 |

OTHER PUBLICATIONS

PCT International Search Report dated Jun. 13, 2006.
Yi Yang et al., MIMO transceiver design using geometric mean decomposition, Information Theory Workshop, 2004, IEEE, Oct. 2004, pp. 193-197.

* cited by examiner

*Primary Examiner* — David C Payne
*Assistant Examiner* — Nader Bolourchi
(74) *Attorney, Agent, or Firm* — Dickinson Wright PLLC

(57) ABSTRACT

A MIMO transmitting apparatus wherein a low power consumption and a high performance can be achieved by taking the influence of variation in communication distance into account. In this apparatus, a low power consumption design part (701) selectively decides, based on the distance from the other end of communication, whether to perform a pre-coding. When deciding to perform the pre-coding, the low power consumption design part (701) instructs a modulating part (702) to perform a low-order QAM modulation, while instructing a pre-coding part (703) to perform a pre-coding. When instructed to perform a low-order QAM modulation, the modulating part (702) uses a low-order QAM modulation scheme to modulate an input information bit sequence. When instructed to perform a pre-coding, the pre-coding part (703) uses a pre-coding matrix to pre-process the input information bit sequence.

5 Claims, 9 Drawing Sheets

MIMO TRANSMITTING APPARATUS AND MIMO TRANSMITTING METHOD

TECHNICAL FIELD

The present invention relates to a MIMO transmitting apparatus and MIMO transmitting method. More particularly, the present invention relates to a MIMO transmitting apparatus and MIMO transmission method that make it possible maintaining low power consumption in low-level modulation schemes and provide high-speed data transmission.

BACKGROUND ART

Wireless networks, multimedia techniques and the Internet are integrated, and so demands are increasing for types and quality of wireless communication operations. In order to satisfy requirements for wireless multimedia and high-speed data transmission, development of new-generation wireless communication systems is demanded. Among the systems, MIMO (Multi-Input Multi-Output) wireless transmission techniques attract a widespread attention.

By employing the MIMO technique, it is possible to obtain a space diversity and multiplex gain. Further, in the MIMO technique, when the number of receiving antennas is equal to greater than the number of transmitting antennas, there is a linear relationship between the MIMO channel capacity in Rayleigh fading and the number of transmitting antennas. The MIMO technique makes it possible to significantly increase system capacity without consuming extra power and bandwidth and furthermore remarkably improve transmission link quality. Accordingly, the MIMO technique is suitable for multimedia operations with high transmission rates such as audio, video and the like.

FIG. 1A is a block diagram showing a configuration of a conventional MIMO transmitting apparatus. FIG. 1B is a block diagram showing a configuration of a conventional MIMO receiving apparatus. The transmitting side and receiving side each have $N_t$ transmitting antennas 106 and $N_r$ receiving antennas 108. On the transmitting side, an input information bit sequence is outputted to coding module 101. Coding module 101 carries out error correction coding on the bit sequence such that robustness to noise is provided. The encoded bit sequence is outputted to modulation module 102. Modulation module 102 carries out digital modulation on the encoded sequence. The above operation is mainly carried out in a baseband section of the transmitter. The modulated baseband code is outputted to a radio section on the transmitting side. In the radio section, first, frequency synthesizer 107 generates a carrier signal required at mixer 103. The generated signal is outputted to mixer 103. The radio section carries out carrier modulation on the baseband input signal. The carrier-modulated signal is outputted to pulse forming filer 104. Pulse forming filter 104 carries out pulse forming processing on a transmission code. Finally, power amplifier 105 amplifies signal power. Then, the amplified signal is transmitted on the channel.

On the receiving side, low-noise amplifier (LNA) 109 amplifies a received carrier signal. The amplified carrier signal is inputted to filter 110. Filter 110 carries out filtering processing on the input signal. Mixer 111 down-coverts the carrier signal into a baseband signal. Intermediate-frequency amplifying filter 112 amplifies and filters the down-converted signal. Then, the amplified and filtered signal is inputted to baseband signal detecting section 113. Baseband signal detecting section 113 divides transmission signals of antenna branches. Demodulating section 114 demodulates the code to a bit sequence. Decoding section 115 decodes the demodulated bit sequence to an information bit sequence.

DISCLOSURE OF INVENTION

Problems to be Solved by the Invention

However, in the MIMO system, the transmitting and receiving sides use a plurality of antennas, and the problem naturally follows that the system configuration increases by multiples and power consumption also increases accompanying the system configuration. As a result, in the MIMO system, it is demanded that power consumption is reduced by a rational design method. Particularly, user terminals have limited battery power, and so power consumption is a significant factor in apparatuses where power is supplied using batteries. Accordingly, low power consumption and miniaturization are most seriously demanded in current wireless communication apparatuses, particularly, in mobile apparatuses. Currently, certain design techniques for low power consumption systems focus only on transmission techniques, and are directed to minimizing transmission power of bits. However, the problem is that power consumption of electronic components cannot be neglected in response to changes in communication distance.

It is an object of the invention to provide a MIMO transmitting apparatus and MIMO transmission method that make it possible to realize low power consumption and high performance by taking into account the influence of changes in the communication distance.

Means for Solving the Problem

A MIMO transmitting apparatus of the present invention employs a configuration including: a selecting section that selects whether or not to carry out precoding based on a distance from a communicating party; a modulating section that individually modulates input information bit sequences of a plurality of branches using a modulation scheme having a M-ary modulation number equal to or less than a predetermined M-ary modulation number, when the selecting section selects carrying out precoding; a pre-coding section that multiplies a pre-coding matrix with the input information bit sequences modulated at the modulating section when the selection selects carrying out precoding; and a transmitting section that transmits at the same time from a plurality of antennas the input information bit sequences each multiplied by the pre-coding matrix at the pre-coder.

A MIMO transmission method of the present invention includes the steps of: selecting carrying out preceding when a distance from a communicating parity is equal to or greater than a predetermined distance; modulating input information bit sequences of a plurality of branches individually using a modulation scheme having a M-ary modulation number equal to or less than a predetermined M-ary modulation number when the preceding is selected to be carried out; multiplying a pre-coding matrix with the modulated input information bit sequences when the pre-coding is selected to be carried out; and transmitting at the same time from a plurality of antennas the input information bit sequences each multiplied by the precoding matrix.

Advantageous Effect of the Invention

The present invention makes it possible to realize low power consumption and high performance by taking into account the influence of changes in the communication distance.

BEST MODE FOR CARRYING OUT THE INVENTION

Figure 1A:
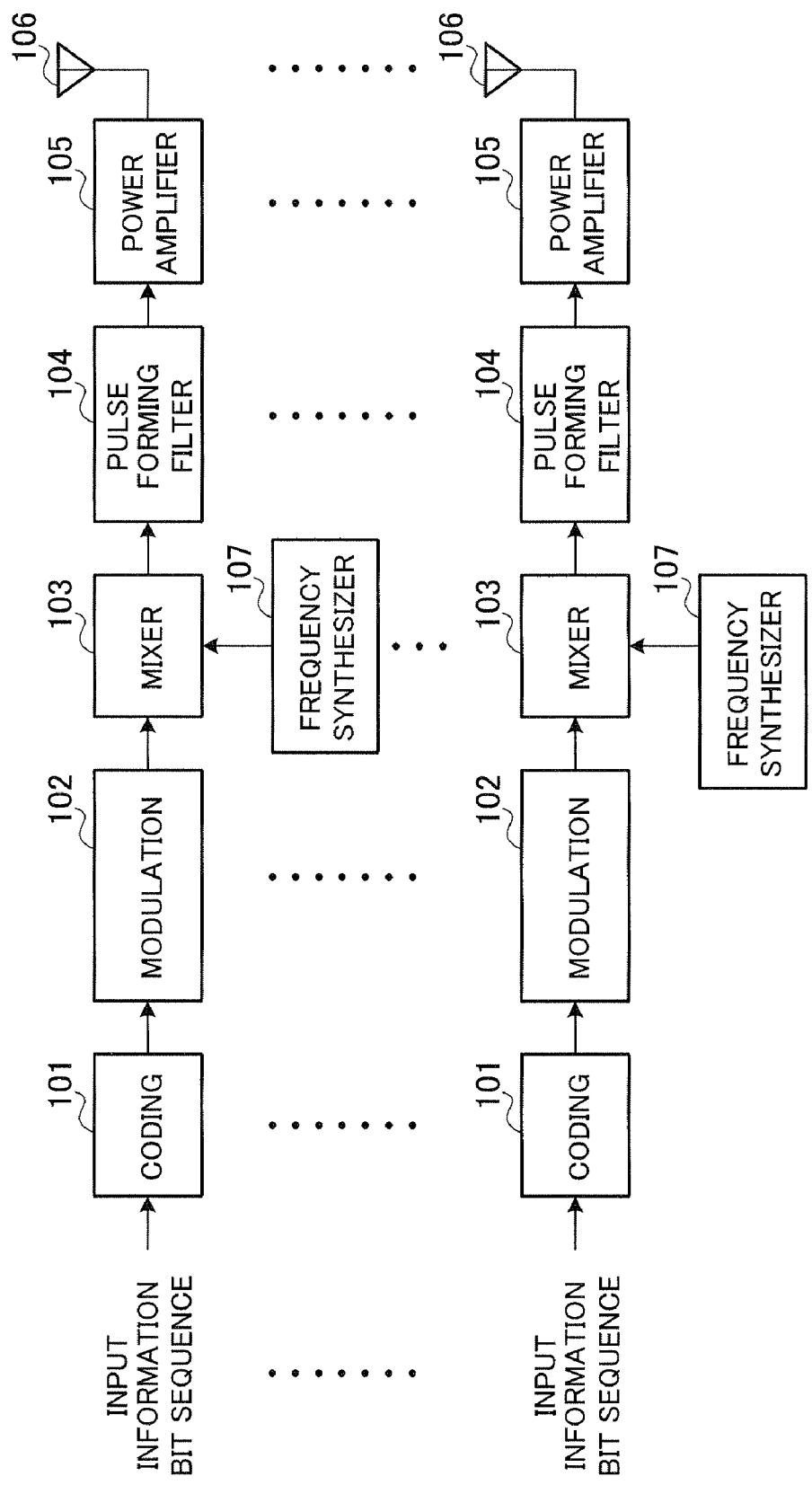
FIG. 1A is a block diagram showing a configuration of a conventional MIMO transmitting apparatus.

The present invention will be described in detail below with reference to the accompanying drawings. The embodiment described herein is intended to explain the invention and not intended to limit the scope of the invention.

Embodiment

It is assumed that branches of a multi-antenna system each have the same devices and the same power consumption. System power consumption includes power consumption of devices of radio sections and baseband sections. Particularly, power consumption of the radio sections is total power consumption of electronic parts of the radio sections on the transmitting and receiving sides. Power consumption of the radio section on the transmitting side includes mainly power consumption of a frequency synthesizer, mixer and pulse forming filter. Meanwhile, power consumption of the radio section on the receiving side includes mainly power consumption of a low-noise amplifier, frequency synthesizer, mixer, filter and intermediate-frequency amplifying filter. Further, power consumption of a baseband processing section on the transmitting side is closely related to functional means such as coding and modulation and system parameters. Power consumption of a baseband processing section on the receiving side mainly includes power consumption of a decoding section.

The design target of the low power consumption system is to minimize total system power consumption. There are many parameters in system design. According to studies, system power consumption is closely related to the modulation scheme and propagation distance. Where the propagation distance is short (<10 m), in proportion to the increase of the M-ary modulation number, the system rate increases and consumed power decreases gradually. However, in proportion to the increase of the propagation distance (<50 m), there is an inflection point in the M-ary modulation number. When the M-ary modulation number is below the inflection point, the power consumption tends to decrease, and when the M-ary modulation number is above the inflection point, the inflection point gradually increases. When the propagation distance is equal to or greater than 100 m, the power consumption quickly increases.

According to simulation results, attention should be directed toward power consumption influenced by factors such as a communication distance and the like. Therefore, it may be possible to select different modulation schemes in response to changes in distance. When the distance is less than 100 m, power consumption does not differ much between low-level QAM modulation and high-level QAM modulation, so that it is possible to use a typical modulation scheme in response to the transmission rate of operations and quality requirement. When the distance is greater than 100 m, system power consumption greatly increases by using modulation schemes higher than 64 QAM in the system, and the system requirement for speed is not satisfied by using low-level QAM modulation. Accordingly, in low-level modulation schemes, a multi-antenna communication system is desired that makes it possible to keep low power consumption and realize high transmission rates.

Thus, by introducing a pre-coding matrix on the transmitting side, it is possible to decompose the MIMO channel matrix into the same sub-channels and provide a greater number of branches of transmission information sequences, so that it is possible to avoid using high-level modulation schemes, realize high transmission rates by using constellations of small M-ary modulation numbers and reduce system power consumption.

If the same devices are employed in antenna branches, power consumption become the same in the branches. First, total power consumption of electronic parts of the radio sections on the transmitting and receiving sides is analyzed. That is, the relationship of equation 1 holds.

[1]

$$E_{cir} = P_{cir\_tx}T_{tx} + P_{cir\_rx}T_{rx} \qquad \text{(Equation 1)}$$

where $E_{cir}$ is total power consumption, $P_{cir\_tx}$ is power consumption on the transmitting side, $T_{tx}$ is transmitter response time, $P_{cir\_rx}$ is power consumption on the receiving side, and $T_{rx}$ is receiver response time.

Power consumption of the radio section on the transmitting side includes mainly power consumption of frequency synthesizers 107 to 107', mixers 103 to 103' and pulse forming filters 104 to 104'. That is, the relationship of equation 2 holds.

[2]

$$P_{cir\_tx} = P_{mix} + P_{fil} + P_{syn} \qquad \text{(Equation 2)}$$

where $P_{mix}$ is power consumption of mixers, $P_{fil}$ is power consumption of pulse forming filters, and $P_{syn}$ is power consumption of frequency synthesizers.

Power consumption of the radio section on the receiving side includes mainly power consumption of low-noise amplifiers 109 to 109', frequency synthesizers 116 to 116', mixers 111 to 111', filters 110 to 110' and intermediate-frequency amplifying filters 112 to 112'. That is, the relationship of equation 3 holds.

[3]

$$P_{cir\_rx} = P_{LNA} + P_{mix} + P_{fil} + P_{syn} + P_{IFA} \qquad \text{(Equation 3)}$$

where $P_{mix}$ is power consumption of mixers,
$P_{fil}$ is power consumption of filters,
$P_{syn}$ is power consumption of frequency synthesizers,
$P_{LNA}$ is power consumption of low-noise amplifiers,
and $P_{IFA}$ is power consumption of intermediate-frequency amplifying filters.

For general electronic parts, typical values of power consumption are as shown in Table (1), as described in "Modulation Optimization under Energy Constraints" presented by S. Cui, A. J. Goldsmith and A. Bahai in ICC'03 held in May, 2003 in Alaska, U.S.A.

TABLE 1

| Variable | Power consumption value (mW) |
|---|---|
| $P_{mix}$ | 30.3 |
| $P_{fil}$ | 50 |
| $P_{syn}$ | 20 |
| $P_{LNA}$ | 5 |
| $P_{IFA}$ | 3 |

Power is consumed in the radio sections, and power is also consumed in the baseband sections on the transmitting and receiving sides. Power consumption of the baseband processing section on the transmitting side is closely related to functional means such as coding, modulation and the like and system parameters. Power consumption in the baseband section can be modeled by following equation 4 based on the model of "A Framework for Energy-Scalable Communications in High-Density Wireless Networks" presented by R. Min and A. P. Chandrakasan in ISLPED '02 that will be issued soon.

[4]

$$E_{tx} = T_{tx}[\alpha_{amp} + \beta_{amp} c_{ploss} d^n P_{rec}(BER, R_c, K_c)] \quad \text{(Equation 4)}$$

where $$T_{tx} = \frac{N}{R \times R_c \times \log_2 M}$$

is response time, and
$P_{rec}$ is received power.

Received power $P_{rec}$ of equation 4 is a function of system bit error rate (BER) coding rate $R_c$ and code constraint length $K_c$. The function is defined as in table 2.

TABLE 2

| Variable | Physical meaning | Typical value |
|---|---|---|
| N | Effective number of bits in each transmission | 1000 |
| R | Transmission coding rate | 1e6 |
| $R_c$ | Coding rate | ½, ⅔ |
| M | M-ary modulation number | 2, 4, 8, 16, 64, 128 |
| $\alpha_{amp}$ | Amplifier reactive constant | 17 mW |
| $\beta_{amp}$ | Amplifier effective coefficient | 5.0 |
| $c_{ploss}$ | Path loss | 30 dB/m |
| n | Path loss factor | 3.5 |
| BER | Bit error rate | |

TABLE 2-continued

| Variable | Physical meaning | Typical value |
|---|---|---|
| D | Propagation distance | |
| $K_c$ | Coding constraint length | |

For M-QAM schemes, received power is expressed by equation 5.

[5]

$$P_{rec} = N_0(M-1)\log\frac{4(1-M^{-1/2})}{BER} \quad \text{(Equation 5)}$$

where $N_0$ is noise power.

Although power consumption of the baseband processing section on the receiving side mainly includes power consumption of decoding sections 115 to 115', power consumption of demodulating sections 114 to 114' is relatively low, modeling is difficult in a combination of power consumption of demodulation and decoding, and therefore, only power consumption in decoding sections 115 to 115' is considered. Power consumption in decoding sections 115 to 115' can be modeled as expressed by equation 6.

[6]

$$E_{dec} = N\left[\begin{array}{c} C_0 \alpha_c^{K_c} V_{dd}^2 + \\ \left(\frac{f_{max}}{f} T_0 \alpha_t^{K_c}\right) V_{dd} I_0 \exp\left(\frac{V_{dd}}{n_0 V_T}\right) \end{array}\right] \quad \text{(Equation 6)}$$

Variables in equation 6 are defined as shown in table 3.

TABLE 3

| Variable | Physical meaning | Typical value |
|---|---|---|
| $C_0$ | Switch capacity/bit (linear coefficient) | 51.6 nF |
| $\alpha_c$ | Switch capacity/bit | 2.62 |
| $V_{dd}$ | Processor supply voltage | 0.9~1.5 v |
| $f_{max}$ | Maximum processor frequency | 59~206 MHz |
| f | Processor frequency | 59~206 MHz |
| $T_0$ | Decoding time/bit (linear coefficient) | 219 ns |
| $\alpha_t$ | Decoding time/bit | 2.99 |
| $I_0$ | Threshold leak coefficient (linear coefficient) | 1.196 mA |
| $n_0$ | Threshold leak coefficient | 21.26 |
| $V_T$ | Threshold voltage | 26 mV |

Accordingly, total system power consumption can be expressed by following equation 7.

[7]

$$E = E_{cir} + E_{tx} + E_{dec} \quad \text{(Equation 7)}$$

Low power consumption system design can be modeled as follows. The minimum system power consumption is minE and rational M-ary modulation number $b_{min} < b < b_{max}$ is selected. Among those, $b = \log_2 M$ is the number of bits transmitted per code. The system is related to many parameters. So, the solution to this problem is complicated to directly calculate, and is analyzed by simulations.

Figure 2:
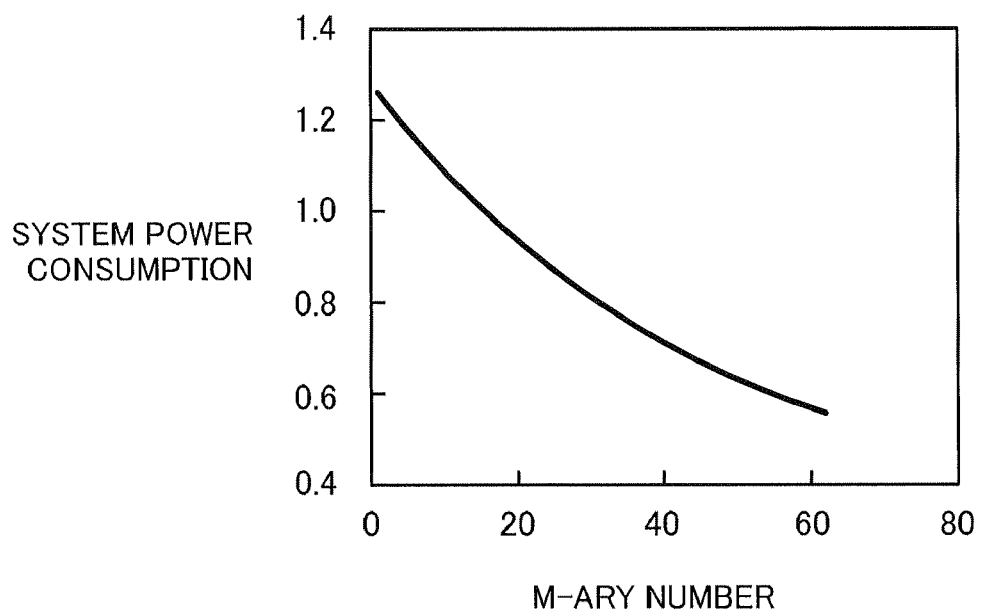
FIG. 2 shows the relationship between an M-ary modulation number and power consumption.

(Simulation Experiment 1)

Where coding constraint length $K_c = 3$, coding rate $R_c = \frac{1}{2}$, propagation distance d=10 m and system bit error rate BER=1e−5 hold, and the other parameters are as described in the table, the result is obtained as shown in FIG. 2. It is understood that, when the M-ary modulation number increases, system power consumption decreases.

Figure 3:
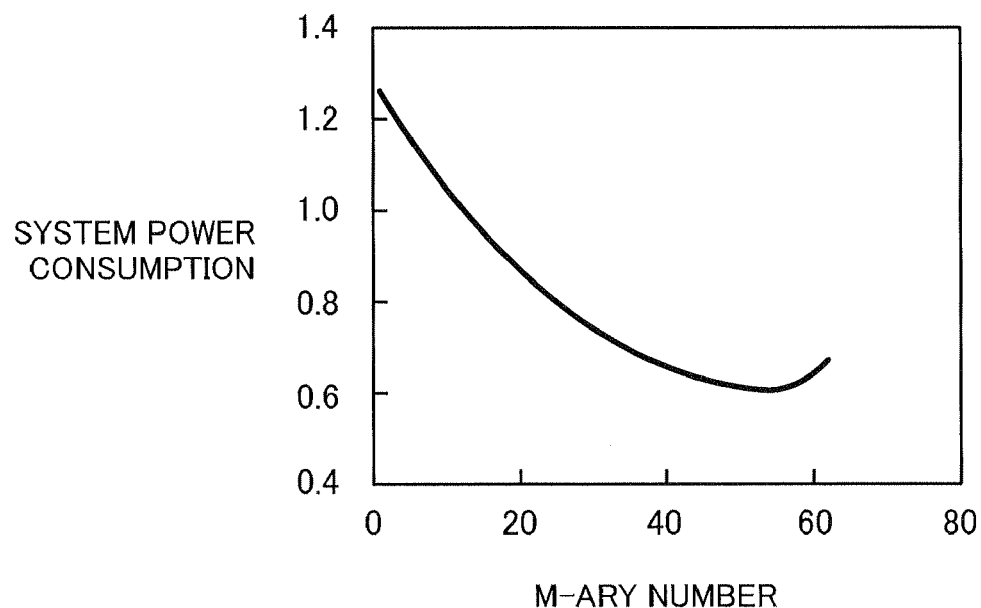
FIG. 3 shows the relationship between an M-ary modulation number and power consumption.

(Simulation Experiment 2)

Where coding constraint length $K_c = 3$, coding rate $R_c = \frac{1}{2}$, propagation distance d=20 m and system bit error rate BER=1e−5 hold, and the other parameters are as described in the table, the result is obtained as shown in FIG. 3. It is understood that, although system power consumption decreases in proportion to the increase of the M-ary modulation number, when the modulation level increases to 64 QAM modulation, power consumption starts to increase gradually.

Figure 4:
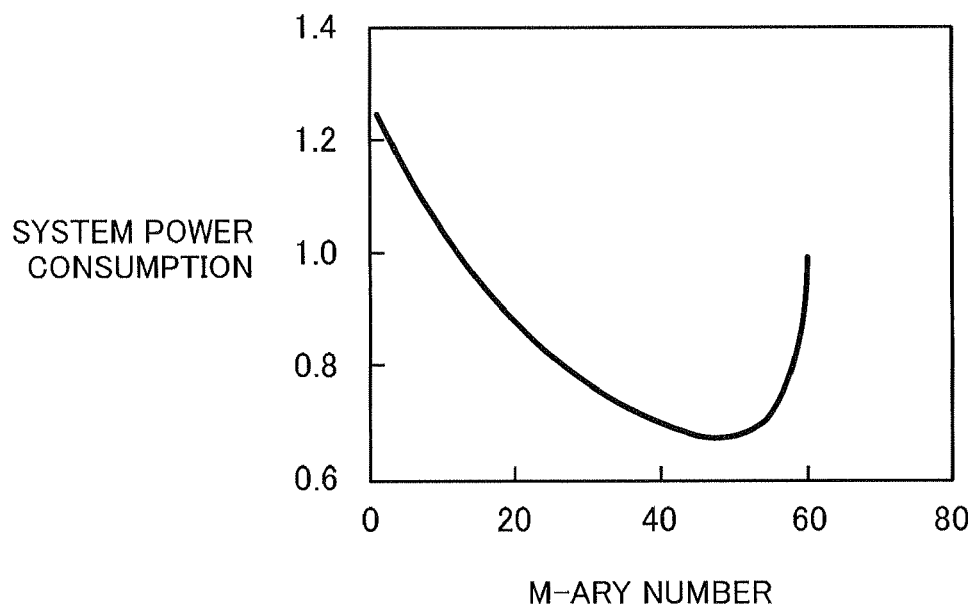
FIG. 4 shows the relationship between an M-ary modulation number and power consumption.

(Simulation Experiment 3)

Where coding constraint length $K_c = 3$, coding rate $R_c = \frac{1}{2}$, propagation distance d=30 m and system bit error rate BER=1e−5 hold, and the other parameters are as described in the table, the result is obtained as shown in FIG. 4. It is understood that, although system power consumption decreases in proportion to the increase of the M-ary modulation number, when the M-ary modulation number increases to 64 QAM modulation, power consumption gradually starts to increase faster.

Figure 5:
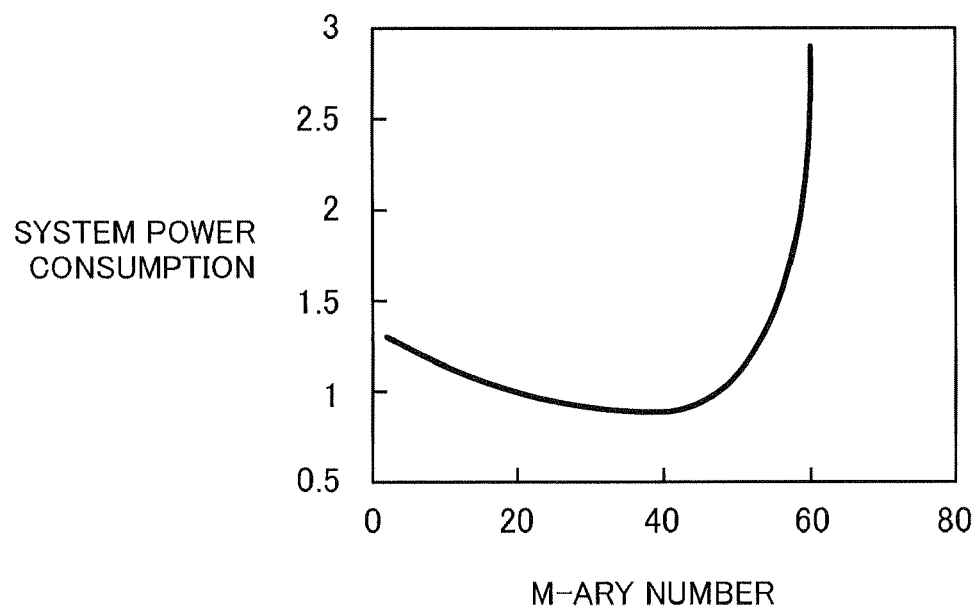
FIG. 5 shows the relationship between an M-ary modulation number and power consumption.

(Simulation Experiment 4)

Where coding constraint length $K_c = 3$, coding rate $R_c = \frac{1}{2}$, propagation distance d=50 m and system bit error rate BER=1e−5, and the other parameters are as described in the table, the result is obtained as shown in FIG. 5. It is understood that although system power consumption decreases in proportion to the increase of the M-ary modulation number in low-level modulation, when the M-ary modulation number increases to 64 QAM modulation, power consumption increases significantly.

Figure 6:
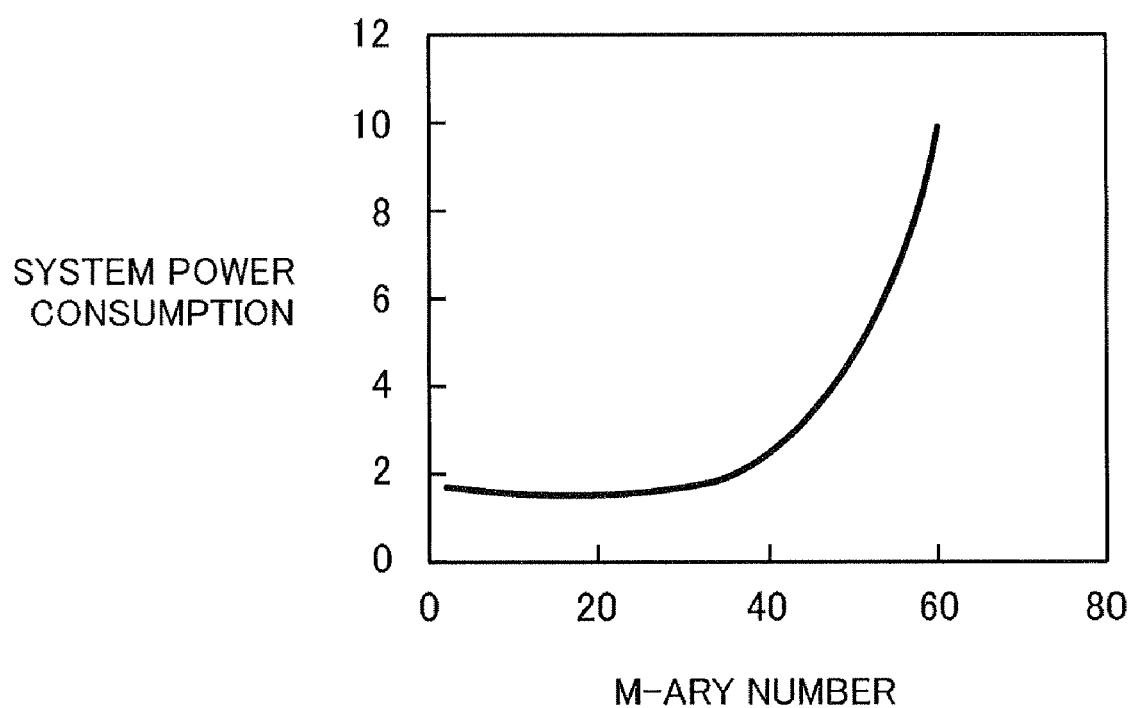
FIG. 6 shows the relationship between an M-ary modulation number and power consumption.

(Simulation Experiment 5)

Where coding constraint length $K_c = 3$, coding rate $R_c = \frac{1}{2}$, propagation distance d=100 m and system bit error rate BER=1e−5, and the other parameters are as described in the table, the result is obtained as shown in FIG. 6. In low-level modulation, even when the M-ary modulation number increases, system power consumption does not differ significantly. However, it is understood that, when the M-ary modulation number increases to 64 QAM modulation, power consumption increases greatly.

As a result of the above simulations, system power consumption is closely related to the modulation scheme and propagation distance, and where the propagation distance is short (<10 m), when the M-ary modulation number increases, the system rate increases and power consumption decreases gradually. However, in proportion to the increase (<50 m) of the propagation distance, there is the inflection point in the M-ary modulation number. When the M-ary modulation number is below the inflection point, power consumption starts to decrease, and when the modulation M-ary is above the inflection point, power consumption gradually increases. When the propagation distance is equal to or greater than 50 m, power consumption quickly increases.

Although adaptive MQAM modulation is employed in general IEEE802.11a standard and its extended IEEE802.11n (MIMO OFDM) standard, both fail to consider the fact that there are significant differences in system power consumption in modulation schemes that differ according to changes in the propagation distance. Based on the above simulation results, the present invention proposes a low power consumption multi-antenna communication system.

In the low power consumption multi-antenna communication system of the present invention, different modulation schemes are selected according to the communication distance. Where the distance from a communicating party is less than 100 m, there is little difference in power consumption between low-level QAM modulation and high-level QAM modulation, so that the low power consumption multi-antenna communication system of the present invention uses typical modulation schemes in response to the transmission rate of operations and quality requirement. Where the distance from the communicating party is equal to or greater than 100 m, when modulation schemes higher than 64 QAM are used in the system, system power consumption greatly increases and, when low-level QAM modulation is used, the system requirement for speed is not satisfied. Accordingly, in order to reduce system power consumption, it is necessary to achieve high transmission rates in low-level modulation schemes. That is, when the distance from a communicating party is equal to or greater than 100 m, the low power consumption multi-antenna communication system of the present invention carries out modulation using modulation schemes having lower M-ary modulation numbers than the M-ary modulation number of 64 QAM.

Figure 1B:
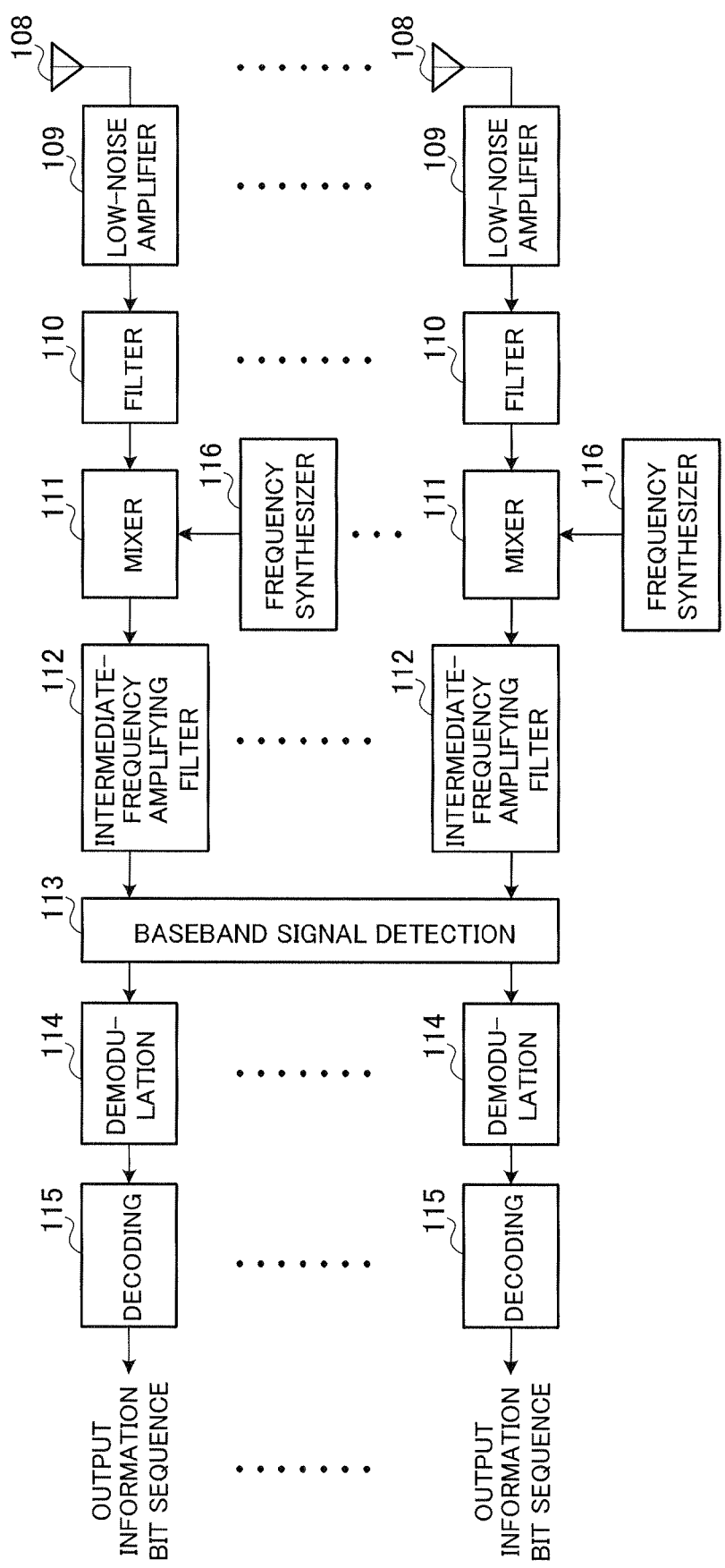
FIG. 1B is a block diagram showing a configuration of a conventional MIMO receiving apparatus.
Figure 7:
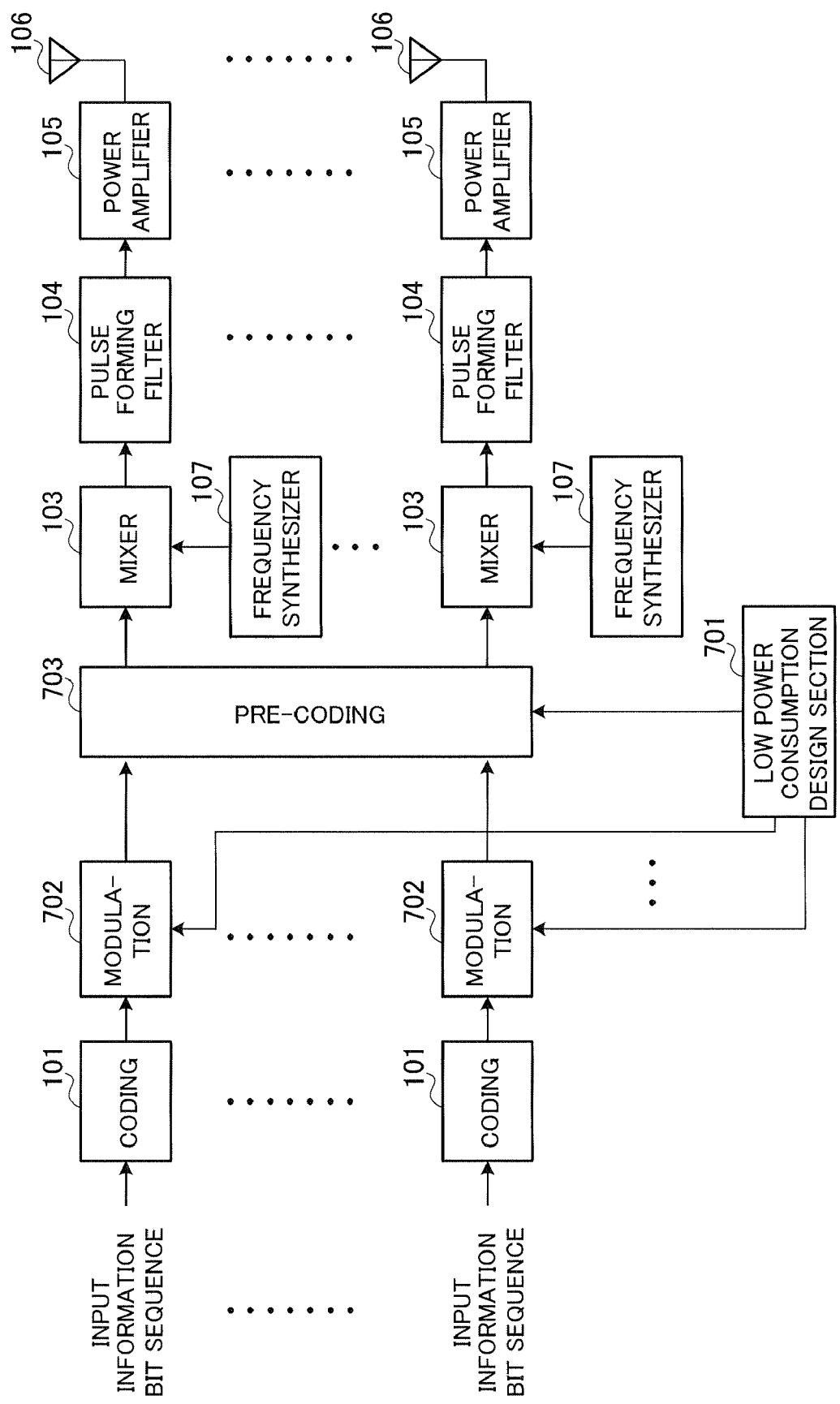
FIG. 7 is a block diagram showing a MIMO transmitting apparatus according to an embodiment of the present invention.
Figure 8:
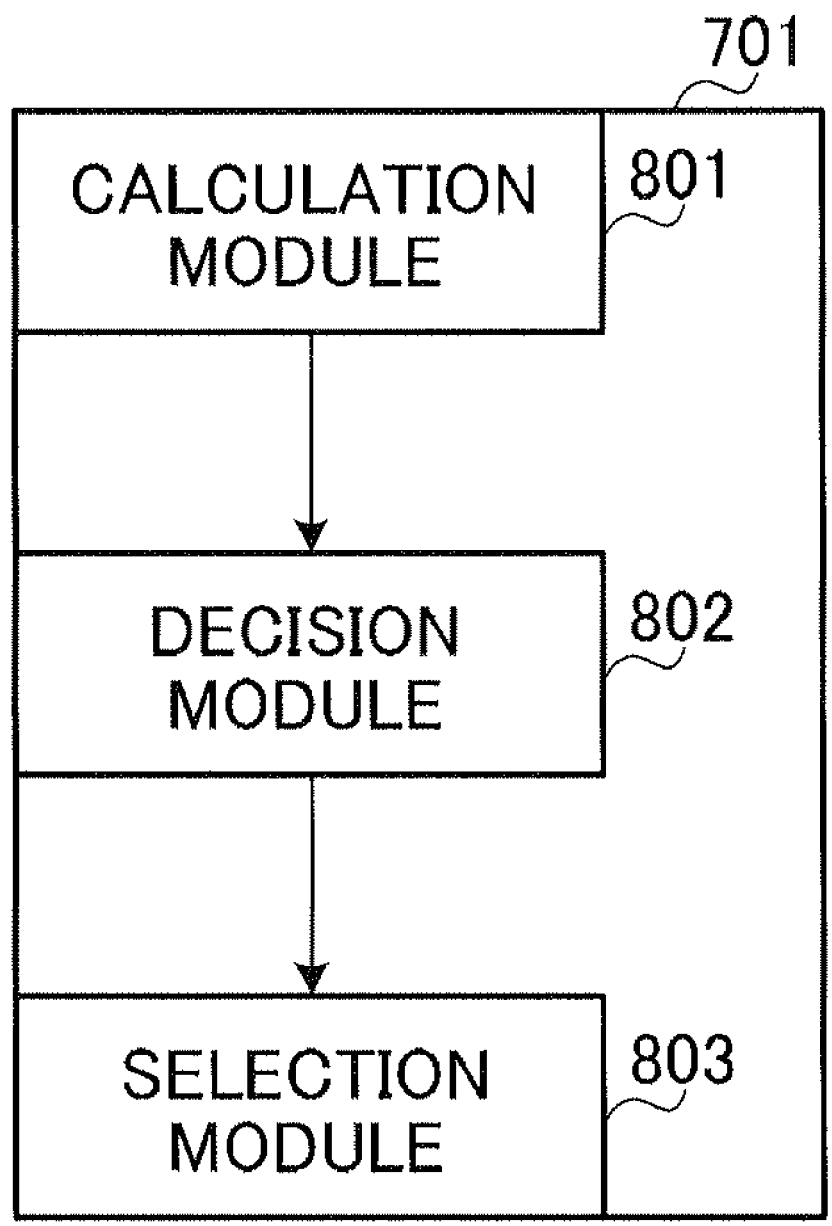
FIG. 8 is a block diagram showing a configuration of a low power consumption design section according to the embodiment of the present invention.

FIG. 7 is a block diagram showing a MIMO transmitting apparatus according to the embodiment of the present invention. FIG. 8 is a block diagram showing a configuration of low power consumption design section 701. Further, in FIG. 7, the same components as in FIG. 1A are assigned the same reference numerals and are not described. Further, a MIMO receiving apparatus has the same configuration as in FIG. 1B, and are not described.

Low power consumption design section 701, which is a selecting means, realizes a low power consumption operation method of the system, estimates the distance from the MIMO receiving apparatus of the communicating party and selects whether or not to carry out pre-coding based on the estimated distance. Then, upon selecting carrying out pre-coding, low power consumption design section 701 commands modulating section 702 to carry out low-level QAM modulation and commands pre-coding section 703 to carry out pre-coding.

Upon being commanded carrying out low-level QAM modulation from low power consumption design section 701, modulating section 702 modulates the input information bit sequence inputted from coding section 101 using a low-level QAM modulation scheme and outputs the result to pre-coding section 703. Meanwhile, upon being not commanded to carry out low-level QAM modulation from low power consumption design section 701, modulating section 702 modulates the input information bit sequence inputted from coding section 101 using a predetermined QAM modulation scheme corresponding to the transmission rate of operations and quality requirement and outputs the result to pre-coding section 703. In this case, both high-level QAM modulation schemes and low-level QAM modulation schemes may be possible.

Upon being commanded to carry out pre-coding from low power consumption design section 701, pre-coding section 703 generates a transform matrix (pre-coding matrix) and carries out pre-processing on the input information bit sequence inputted from modulating section 702 using the generated pre-coding matrix. To be more specific, as the pre-processing, pre-coding section 703 carries out multiplying processing of the input information bit sequences transmitted from respective transmitting antennas 106 with the generated pre-coding matrix. Then, pre-coding section 703 outputs the input information bit sequence multiplied with the pre-coding matrix to mixer 103.

FIG. 8 shows a specific configuration of low power consumption design section 701 of FIG. 7. Calculation module 801 estimates the communication distance between the transmitting side and the receiving side. Decision module 802 compares the distance with 100 m. Based on the comparison result, selection module 803 selects different system operation methods.

Figure 9:
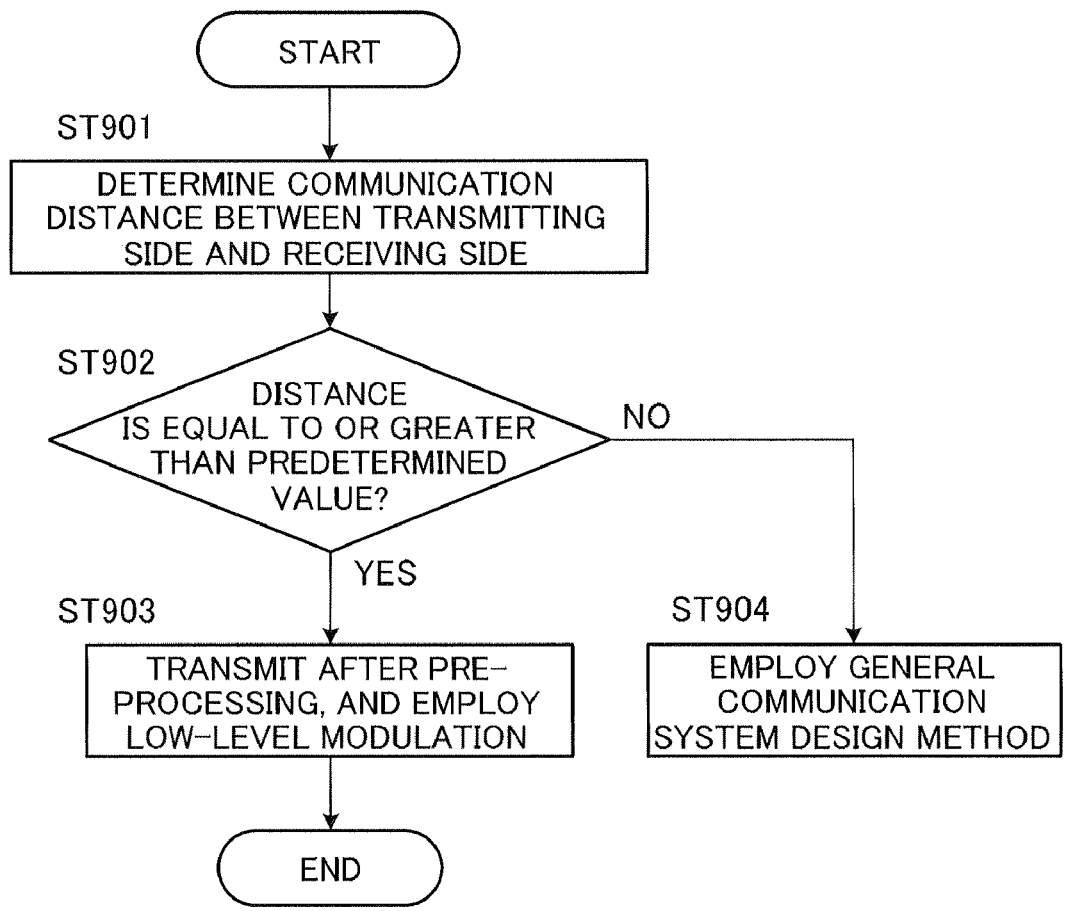
FIG. 9 is a flow chart showing a MIMO transmission method according to the embodiment of the present invention.

FIG. 9 shows the operation method of the low power consumption multi-antenna communication system according to the present invention.

First, the low power consumption multi-antenna communication system determines the communication distance between the transmitting side and the receiving side is determined (ST901). Next, the low power consumption multi-antenna communication system selects the system operation method based on the distance (ST902). When the distance between the transmitting side and the receiving side is less than 100 m, an general communication system operation method is selected (ST904), and, when the distance between the transmitting side and receiving side is equal to or greater than 100 m, the transmitting side carries out the pre-processing on the input bit sequence by using the pre-coding matrix and transmits the input bit sequence (ST903).

Next, the operation principle of the pre-coder will be described. Signals transmitted through antennas are transformed by introducing the pre-coder in order to obtain a system method that makes it possible to realize low power consumption and high transmission rates from a mathematical point of view. For a MIMO system where pre-coding is not carried out, a received signal is expressed by equation 8.

[8]

$$Y = HX + n \quad \text{(Equation 8)}$$

In addition, Y is a vector of $N_r \times$ one-dimensional received signal, X of $N_t \times$ one-dimensional is a vector of a transmission signal with dispersion $\sigma_x^2$ and n is a white Gaussian noise vector with dispersion $\sigma_x^2$. Channel matrix H is expressed by equation 9.

[9]

$$\text{Channel matrix } H = \begin{pmatrix} h_{11} & h_{12} & \ldots & h_{1N_r} \\ h_{21} & h_{22} & \ldots & h_{2N_r} \\ \vdots & \vdots & \ddots & \vdots \\ h_{N_t 1} & h_{N_t 2} & \ldots & h_{N_r N_t} \end{pmatrix} \quad \text{(Equation 9)}$$

The rank of channel matrix H is K. Element $h_{ji}$ in channel matrix H represents a channel fading coefficient from transmitting antenna i to receiving antenna j.

After the transmission signal is subjected to pre-coding by introducing matrix F, the received signal is expressed by equation 10.

[10]

$$Y = HFX + n \quad \text{(Equation 10)}$$

$F = V\Gamma^{1/2}P^*$ is designed. V is obtained from eigenvalue decomposition (SVD) of the channel matrix. That is, $H = U\Lambda V^H$ holds, (where $\Lambda = \text{diag}[\lambda_1 \ldots \lambda_k]$) $\Gamma = \text{diag}[r_1 \ldots r_k]$ are diagonal matrixes (where elements $r_k = (\mu - \lambda_k^{-1})^+$ holds) and $\mu$ satisfies power constraint $\Sigma(\mu - \lambda_k^{-1})^+ = P_T$ (k=1, ..., K). Where $(x)^+$ is defined as max{x,0}, $V\Gamma^{1/2} = \Sigma$ is a diagonal element and diagonal matrix of $\{\sigma_i\}$.

Figures 10A, 10B:
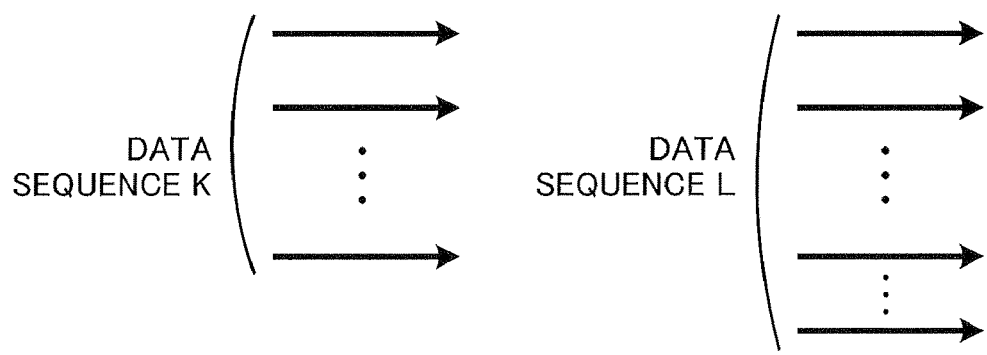
FIG. 10A shows a data sequence before pre-coding.
FIG. 10B shows a data sequence after pre-coding.

In the general MIMO communication system, the number of input information bit sequence branches is equal to the number of antennas $N_t$ on the transmitting side. However, the improved pre-coder of the present invention theoretically makes it possible to set L as an arbitrary number in $N_r \times L$ matrix where L>K holds. Provided that L>K holds, and so the number of input information bit sequence branches is L. FIG. 10A shows a data sequence before pre-coding. FIG. 10B shows a data sequence after pre-coding. As shown in FIG. 10A and FIG. 10B, by increasing the number of bit subsequences to be transmitted at the same time on the transmitting side, it is possible to improve the system speed and perform high-speed transmission operations in low-level modulation schemes.

P can be obtained by referring to the method publicly presented in "The Geometric Mean Decomposition, Linear Algebra and Its Applications" released by Y. Jiang, W. W. Hager and L. Li in December, 2003. As is clear from equation 10, from the channel's point of view, the "virtual" channel matrix after pre-coding is $H_p = HF$, and the relationship is expressed by equation 11.

[11]

$$H_p = (U\Lambda V^*)(V\Gamma^{1/2}P^*) \quad \text{(Equation 11)}$$
$$= U\Lambda \Gamma^{1/2} P^*$$

When diagonal matrix $\Sigma = \Lambda\Gamma^{1/2}$ is defined, $H_p = U\Sigma P^*$ holds. Formation of an augmented matrix is expressed by equation 12.

[12]

$$H_p^a = \begin{bmatrix} U\Sigma P^* \\ \sqrt{\alpha} I_L \end{bmatrix} \quad \text{(Equation 12)}$$

where $$\alpha = \frac{\sigma_n^2}{\sigma_x^2}$$

The matrix of equation 12 can be rewritten as equation 13.

[13]

$$H_p^a = \begin{bmatrix} I_{N_r} & 0 \\ 0 & P_0 \end{bmatrix} \begin{bmatrix} U[\Sigma : 0_{K \times (L-K)}] \\ \sqrt{\alpha} I_L \end{bmatrix} P_0^* \quad \text{(Equation 13)}$$

where $P_0$ is a unitary matrix, and its prior K column forms P.

Equation 14 is a decomposition queue matrix.
[14]

$$\text{Decomposition queue} = \begin{bmatrix} U[\Sigma \vdots 0_{K \times (L-K)}] \\ \sqrt{\alpha}\, I_L \end{bmatrix} \quad \text{(Equation 14)}$$

Geometric mean decomposition is carried out on equation 14 and equation 15 is obtained.
[15]

$$\begin{bmatrix} U[\Sigma \vdots 0_{K \times (L-K)}] \\ \sqrt{\alpha}\, I_L \end{bmatrix} = QRP_0^* \quad \text{(Equation 15)}$$

A semi-unitary matrix, that is, pre-coding matrix $P=[P0^*(:,1:K)]_{L \times K}$, is finally obtained.

Figure 11:
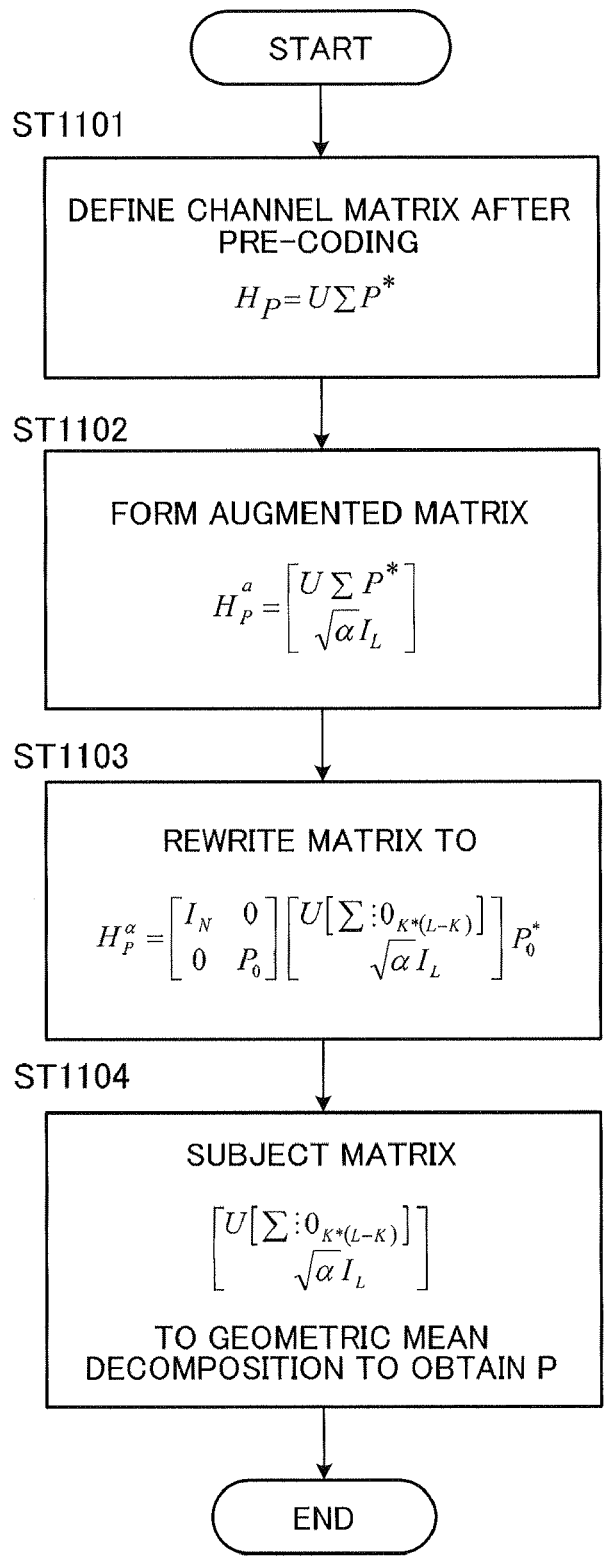
FIG. 11 is a flow chart showing a method of obtaining a solution of a pre-coding matrix.

FIG. 11 shows the steps of obtaining a solution of the pre-coding matrix. A pre-coding matrix and channel matrix are defined, and the channel matrix after pre-coding is further defined (ST1101). An augmented matrix is formed using the channel matrix after pre-coding (ST1102). The augmented matrix is rewritten (ST1103). The pre-coding matrix is obtained by carrying out geometric mean decomposition on the matrix (ST1104).

Thus, by introducing pre-coding matrix P on the transmitting side, it is possible to decompose the MIMO channel matrix into the same sub-channels L and provide a larger number of branches corresponding to transmission information sequences, so that it is possible to avoid using high-level modulation schemes, realize high transmission rates by using a constellation of a small M-ary modulation number and thereby reduce system power consumption. Further, the pre-coding matrix obtained by subjecting the channel matrix to geometric means decomposition makes it possible to equalize the gain of sub-channels of an antenna, reduce the influences on a data sequence transmitted by the sub-channel of deep fading, and thereby improve the bit error rate characteristic of the system.

Further, the above distance of 100 m is an example, and does not limit the present invention. According to FIGS. 2 to 6, thresholds of the distance range of 80 to 150 m may be possible. Furthermore, as is clear from the simulations, when the distance is in or beyond the distance range, system power consumption in high-level modulation increases greatly, so that the low power consumption operation method proposed by the invention may be used.

As described above, the present invention has been described with a typical embodiment. It is obvious to one of ordinary skill in the art that various changes, replacements and/or additions can be made without departing from the spirit and scope of the present invention.

INDUSTRIAL APPLICABILITY

The MIMO transmitting apparatus and MIMO transmission method according to the present invention are suitable for maintaining low power consumption and providing high-speed data transmission.

The invention claimed is:

1. A multi-input multi-output transmitting apparatus comprising:
a selecting section configured for estimating a distance from a communicating party, and selecting whether or not to carry out a pre-coding operation, based on the estimated distance from the communicating party;
a modulating section;
a pre-coding section,
wherein the transmitting apparatus is configured such that when the pre-coding operation is selected by the selecting section:
the modulating section modulates each of input information bit sequences of a plurality of branches, using a modulation scheme having an M-ary modulation number equal to or less than a predetermined M-ary modulation number; and
the pre-coding section multiplies a pre-coding matrix with the input information bit sequences each modulated by the modulating section; and
a transmitting section configured to simultaneously transmit, from a plurality of antennas, the input information bit sequences each multiplied by the pre-coding matrix by the pre-coding section, wherein:
the pre-coding operation makes a number of input information bit sequence branches more than a number of antennas on a transmitting side.

2. The multi-input multi-output transmitting apparatus according to claim 1, wherein the pre-coding section is configured to:
define a channel matrix after the pre-coding operation, using the pre-coding matrix and a channel matrix;
form an augmented matrix, using the defined channel matrix after the pre-coding operation;
rewrite the formed augmented matrix to obtain, a decomposition queue; and
carry out geometric mean decomposition on the obtained decomposition queue to obtain the pre-coding matrix to be multiplied with the input information bit sequences.

3. The multi-input multi-output transmitting apparatus according to claim 1, wherein the selecting section is configured to select carrying out the pre-coding operation when the estimated distance from the communicating party is equal to or greater than 100 meters.

4. The multi-input multi-output transmitting apparatus according to claim 3, wherein the modulating section is configured to modulate each of the input information bit sequences, using a quadrature amplitude modulation scheme having an M-ary modulation number lower than 64, when the selecting section selects carrying out the pre-coding operation.

5. A multi-input multi-output transmission method comprising:
estimating a distance from a communicating party;
selecting carrying out a pre-coding operation, when the estimated distance from the communicating party is equal to or greater than a predetermined distance;
modulating each of input information bit sequences of a plurality of branches, using a modulation scheme having an M-ary modulation number equal to or less than a predetermined M-ary modulation number, when the pre-coding operation is selected to be carried out;
multiplying a pre-coding matrix with the modulated input information bit sequences, when the pre-coding operation is selected to be carried out; and
simultaneously transmitting, from a plurality of antennas, the input information bit sequences each multiplied by the pre-coding matrix, wherein:
the pre-coding operation makes a number of input information bit sequence branches more than a number of antennas on a transmitting side.

* * * * *